US005761052A

United States Patent [19]
Wheeler-King et al.

[11] Patent Number: 5,761,052
[45] Date of Patent: Jun. 2, 1998

[54] INTERCONNECTION SYSTEM FOR ELECTRONIC CONTROLLERS TO A BUS

[75] Inventors: Frank Michael Reginald Wheeler-King, Berkhamsted; Sally Elizabeth Warren, Garston; Robert William Baker, Kenton, all of Great Britain

[73] Assignee: The Whitaker Corporation, Wilmington, Del.

[21] Appl. No.: 752,150

[22] Filed: Nov. 19, 1996

[30] Foreign Application Priority Data

Nov. 30, 1995 [GB] United Kingdom ............ 9524543

[51] Int. Cl.$^6$ .............. H05K 7/10; H05K 1/11; H01R 9/09; H01R 9/07
[52] U.S. Cl. ............ 361/803; 361/785; 361/789; 361/796; 361/823; 361/826; 361/775; 439/61; 439/709; 174/59; 174/60
[58] Field of Search ............ 361/785, 789, 361/796, 803, 823, 826, 736, 737, 775, 749, 752; 439/61, 637, 709, 922; 174/59, 60, 254, 72 A

[56] References Cited

U.S. PATENT DOCUMENTS

| 3,270,313 | 8/1966 | Sautois | 439/329 |
| 3,725,843 | 4/1973 | Johnson | 361/775 |
| 4,072,379 | 2/1978 | Towne et al. | 439/61 |
| 4,846,735 | 7/1989 | Teichler et al. | 439/709 |
| 5,006,961 | 4/1991 | Monico | 439/61 |
| 5,595,505 | 1/1997 | Duke et al. | 439/709 |

FOREIGN PATENT DOCUMENTS 0 680 113-A1  11/1995  European Pat. Off. ........ H01R 4/34

Primary Examiner—Leo P. Picard
Assistant Examiner—John B. Vigushin
Attorney, Agent, or Firm—Bradley N. Ditty

[57] ABSTRACT

An interconnection system is for interconnecting sensors, such as temperature gauges for controlling industrial processes, to a bus cable that interconnects the sensors to a central computation unit. The connection assembly comprises edge card connectors for connection to electronic modules having printed circuit boards. The plurality of modules are interconnected to the ribbon cable bus by a printed circuit board, and a connector mounted on the PCB and pluggable with a bus connector terminated to the cable.

6 Claims, 4 Drawing Sheets

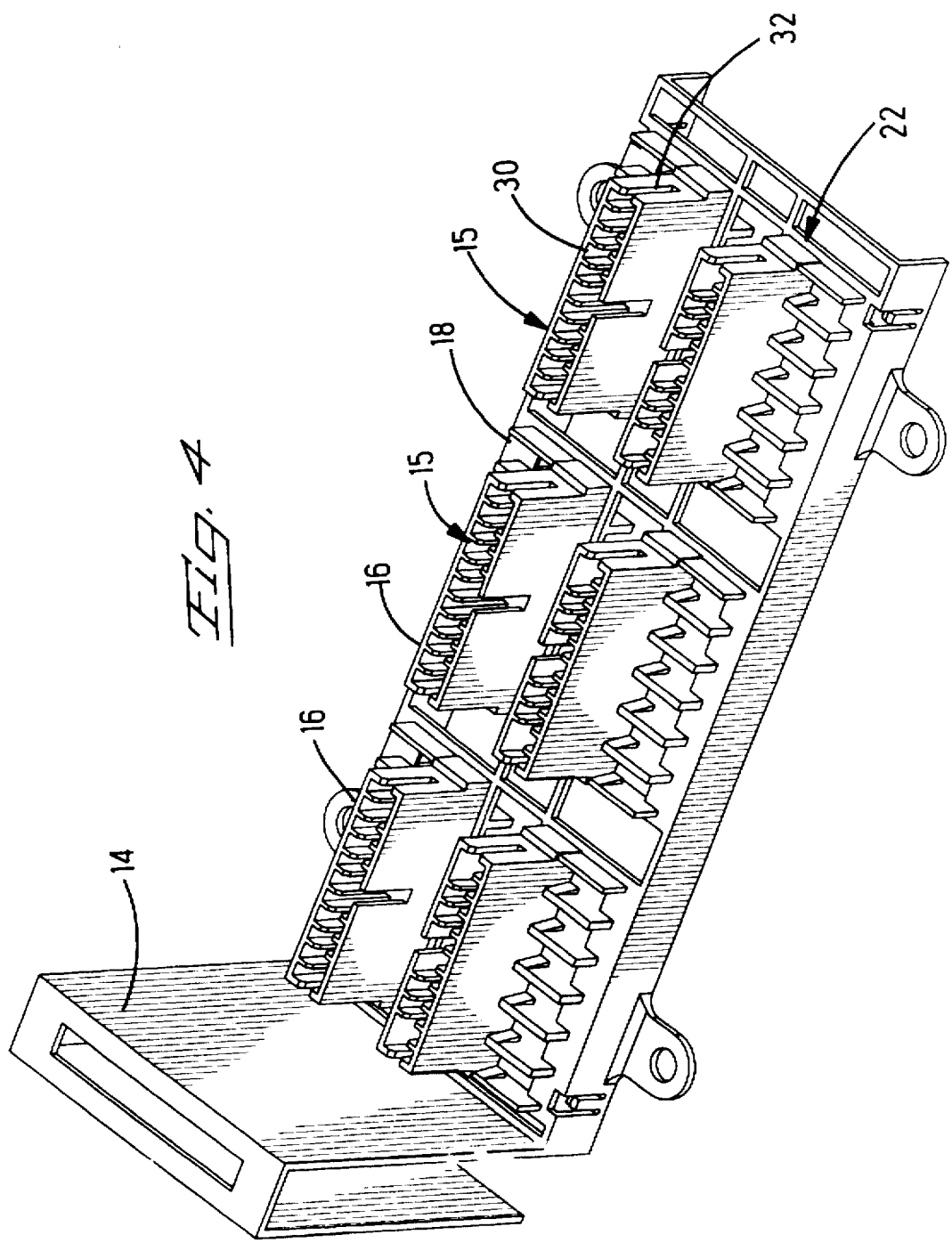

INTERCONNECTION SYSTEM FOR ELECTRONIC CONTROLLERS TO A BUS

BACKGROUND OF THE INVENTION

1. Field of the Invention

This invention relates to an interconnection system for connecting devices for process control, for example temperature sensors, to a field bus that interconnects a plurality of devices at different sites to a central computation system, whereby the devices are interconnected to the bus via electronic modules that pre-process the signals from the devices.

2. Description of the Prior Art

Industrial processes for the manufacture of chemicals or other goods have a variety of parameters that need to be controlled and monitored during various stages of the process. This may, for example, be temperature, humidity etc. measured by the provision of sensors. The sensors produce electrical signals that need processing in order for the signals to be in a readable form by a computing unit that displays, or uses the information for process control. Even sensors of a same family, for example temperature sensors, need different electronic processing, depending on the physical characteristics of the temperature gauge, its range of functioning, etc. The sensors also require individual calibration for high accuracy. In such cases, it is known to provide separate, exchangeable dedicated electronic modules dedicated to a particular sensor, that interconnect the sensor to a computation unit that uses the information produced by the sensor, for example to monitor the parameter on a display or for automatic correction of the process.

The dedicated modules are often provided on or proximate the computation unit, often meaning that such a device, which may comprise a monitor for example, is positioned close to the sensor, rather than all the devices relating to the process being centrally located. The non-central location for such devices, or the relatively complicated and messy interconnection thereof is a particular problem.

It would be advantageous to centralize the computing devices and simplify the interconnection between a plurality of sensors or other process control devices.

SUMMARY OF THE INVENTION

It is an object of this invention to provide a simplified interconnection system for interconnecting process control devices to a central computation unit.

It is an object of this invention to provide an interconnection system for interconnecting sensors or other process control devices to a bus via dedicated electronic modules, in a simple, reliable and easy to assemble manner.

It is further desirable to provide an interconnection system for connecting process control sensors or other devices to a bus via dedicated electronic modules, whereby such modules are quickly and easily replaceable, and whereby the interconnection system is very flexible with respect to its location and ease of installation.

Objects of this invention have been achieved by providing an interconnection system according to claim 1. A bus interconnection system comprises a connection assembly having a plurality of edge card connectors attached together with a main housing, at least one electronic module having a PCB pluggable at one end to one of the edge card connectors, and a module interconnection board with connectors thereon, each for plugging onto the other end of the PCB of each module, the module interconnection board electrically interconnecting the modules to a bus connector that pluggably connects to a complementary bus connector mounted on the main housing and for connection to a bus cable.

Advantageously therefore, a particularly simple and flexible interconnection system allowing quick and easy replacement of the dedicated electronic modules is provided.

Further objects and advantageous aspects of the invention will be apparent from the description and claims.

BRIEF DESCRIPTION OF THE DRAWINGS

FIG. 4 is an isometric view of a main housing member of the interconnection assembly.

DETAILED DESCRIPTION OF THE PREFERRED EMBODIMENT

Figure 1:
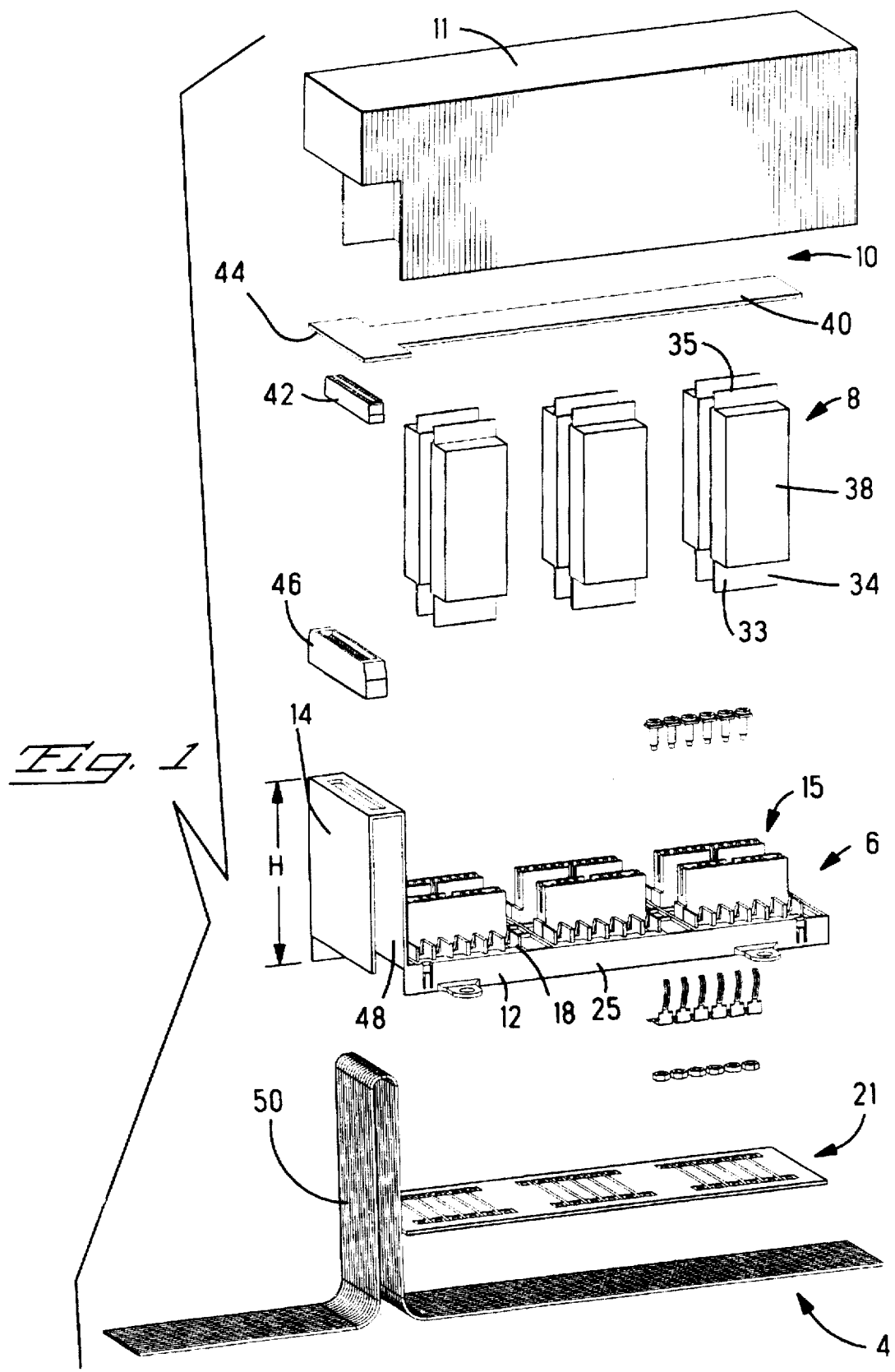
FIG. 1 is an exploded isometric view of an interconnection system according to this invention.

Referring to FIG. 1, an interconnection system 2 comprises a bus 4, which in this example is a ribbon cable, a connection assembly 6, dedicated electronic modules 8, and an interconnection board 10.

Figure 2:
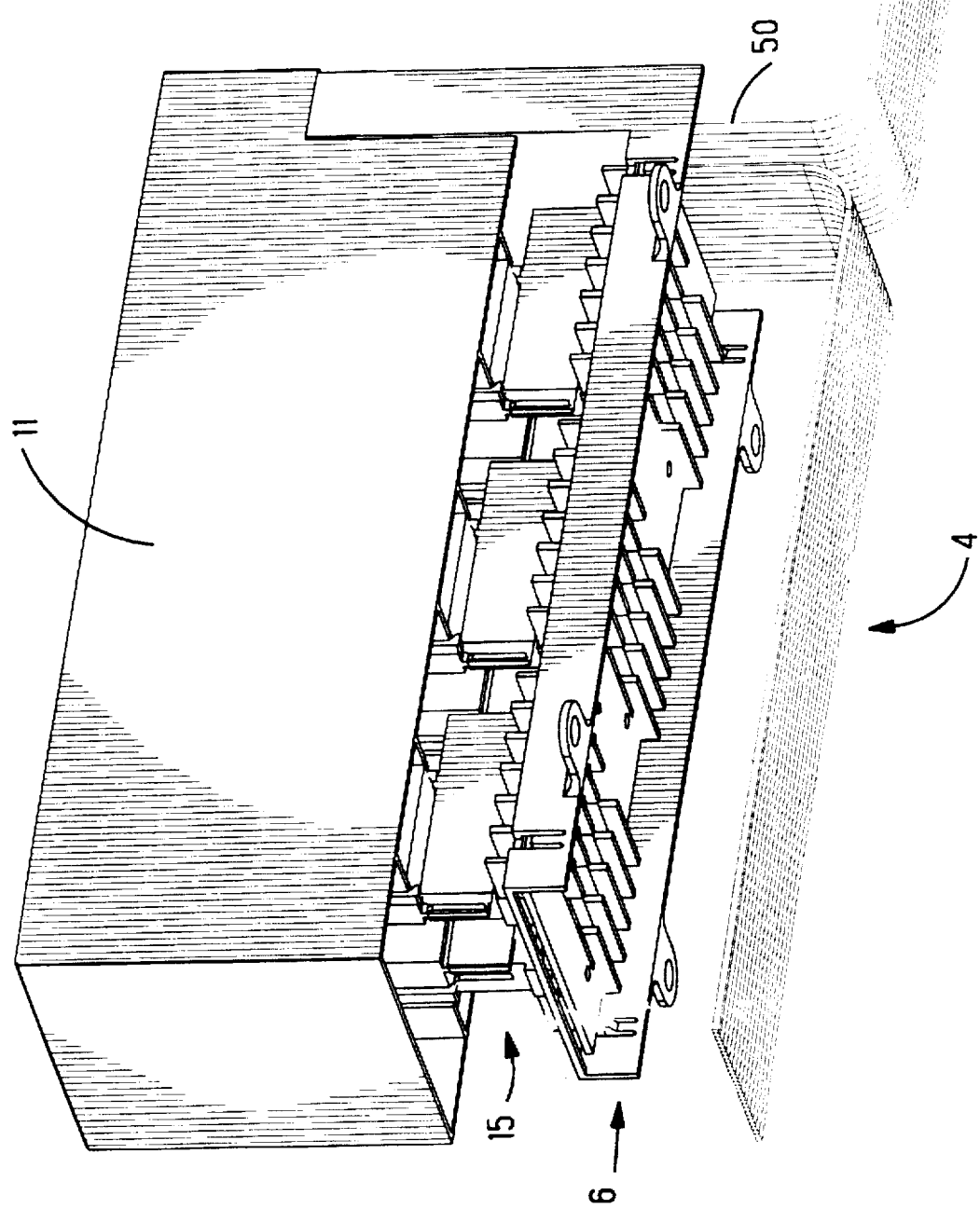
FIG. 2 is another isometric view of the interconnection assembly of FIG. 1 in a partially disassembled state.
Figure 3:
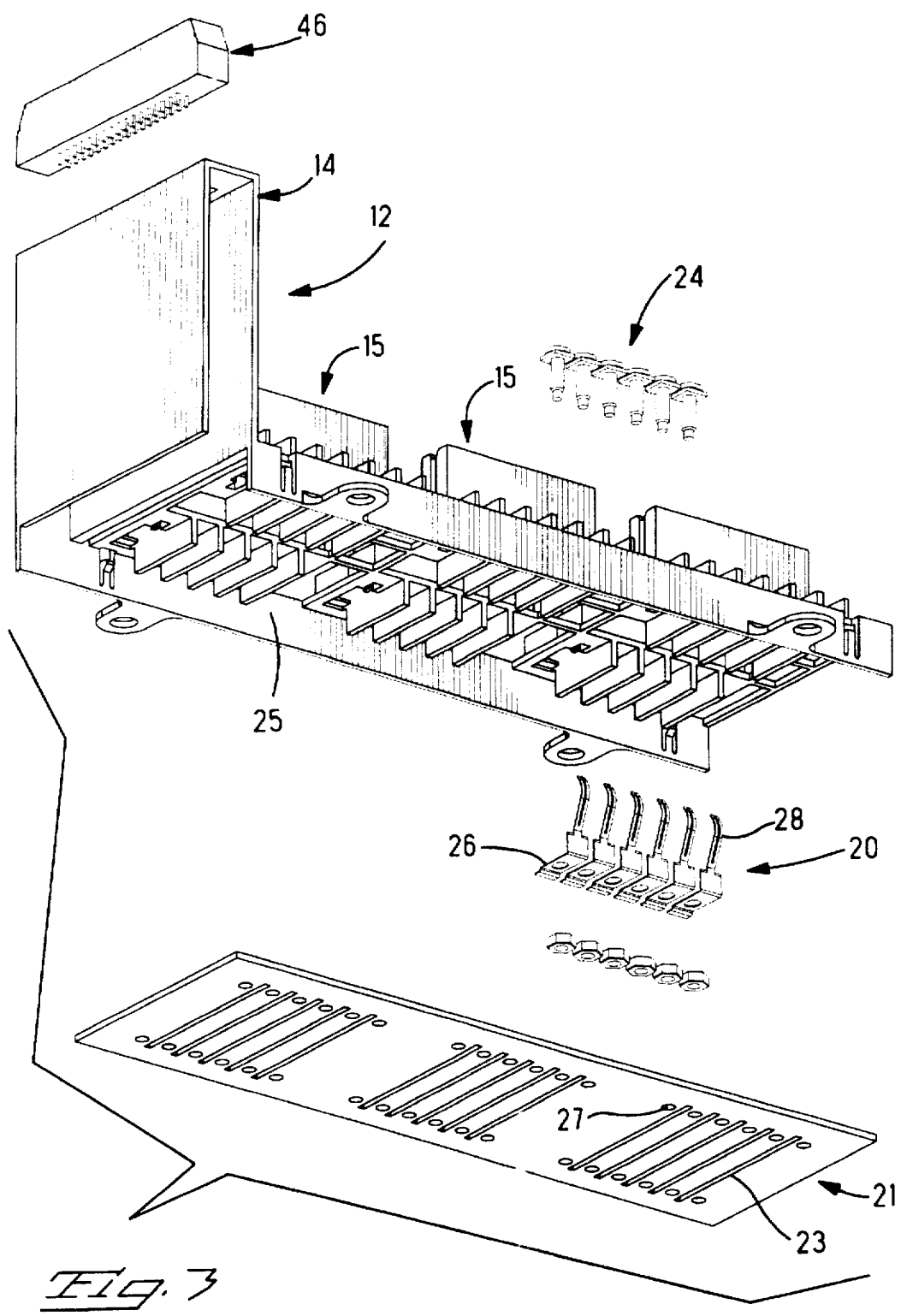
FIG. 3 is another exploded isometric view of the interconnection assembly without cover, dedicated modules, and ribbon cable.

Referring to FIGS. 2 and 3, the connection assembly 6 comprises a main insulative housing 12 with a cable connection section 14 and a plurality of edge card connector housings 16 of edge card connector 15 extending from a base plate 18. The edge card connectors 15 further comprise terminals 20. The edge card connector housing 16 can be integrally moulded to the main housing 12, or can be provided as a separate connector housing, whereby the edge card connector 15 could have a similar construction to that described in European Patent Application EP 0 680 113-A1.

The edge card connectors 15 have a connection section 22 where conducting wires of a sensor or other control device can be interconnected to the terminals 20 by clamping of the screws 24 against a plate portion 26 of the spring terminals 20. From the plate portion 26 extends cantilevered beam spring contact arms 28 positioned in cavities 30 of the edge card connector housing 16. A central edge-card receiving slot 32 cuts through the cavities 30 and is for receiving an edge card 34 of one of the dedicated modules 8 therein such that the spring contact arms 28 bias against circuit traces of the edge card 34. A plurality of the dedicated modules 8 can thus be plugged to the plurality of edge card connectors 15 arranged in two rows, and a plurality of sensors or other control devices can be interconnected to the screw clamp terminals and therefore to the modules 8. The screw clamp terminal plate portions 26 of the terminals are arranged along an outer edge 25 of the base 18 for way access by the sensor wires.

As best seen in FIG. 3, a printed circuit board 21 is disposed in a recess 25 of the housing 12 below the edge card connectors 15. The printed circuit board 21 has circuit traces 23 for interconnecting or bridging certain of the edge card contacts 28 that are mounted and electrically connected to plated through holes 27 of the printed circuit board 21.

Each of the modules 8 comprises the printed circuit board 34 having connection ends 33,35 on opposed ends, and a housing 38 enclosing electrical/electronic components mounted on the printed circuit board that serve to process the electrical signals of the sensors. The processed signals are interconnected to a central computation unit via the field bus cable 4. In order to connect the modules to the cable 4, a module interconnection board 10 comprises a printed circuit board 40 having edge card connectors (not shown) thereon for connection to the module connection ends 35, the edge card connectors being interconnected via circuit traces on the PCB 40 to a bus connector 42 attached to one end 44 of the PCB 40.

The bus connector 42 is matable with a complementary bus connector 46 that has a plurality of juxtaposed conductive contacts therein that can be interconnected to the cable 4. The cable 4 may be a ribbon cable having a plurality of parallel juxtaposed conductive wires overmoulded and held together by a common insulating layer. Contacts of the complementary bus connector 46 can be connected to the individual conducting strands of the ribbon cable 4 by well known interconnection means, such as insulation displacing contacts. Termination of ribbon cable to a connector with insulation piercing or displacing contacts is well known in the connector art.

The complementary bus connector 46 is provided in the bus connection section 14 of the main housing 12 which extends above the base 18 by a certain height H similar to the height of the modules 8. In such a manner, when plugging the module interconnection board to the module connection ends 35, bus connector 42 simultaneously plugs into the complementary bus connector 46. A number of modules in a compact disposition can thus be reliably, and easily plugged to a bus cable in a cost-effective and compact manner.

The bus connection section 14 comprises a cavity 48 below the connector 46 (which can be separate from the section 14 but latched thereto), in order to receive a U-shaped extension 50 of the cable therein such that it extends to the connector 46 for termination thereto. The use of the insulation piercing connector 46 enables the connection assembly 6 to be positioned anywhere along the bus cable such that the connection assembly can be positioned proximate sensors or process control devices, and a plurality of connection assemblies 6 can be positioned along the same bus 4 at different locations. Furthermore, the bus cable 4 can conveniently extend along and under the base 18 for a neat and compact arrangement.

The bus 4 would be connected to a central computation unit that processes the signals from the sensors or process control devices provided by electronic modules 8. Electronic modules can be easily exchanged at the connection assembly 6 by removing the connector cover 11, unplugging the module interconnection board 10, and exchanging the modules.

Advantageously therefore, a flexible, compact and easy to maintain interconnection system is provided.

We claim:

1. A bus interconnection system comprising a connection assembly having a plurality of edge card connectors attached together with a main housing, at least one electronic module having a PCB pluggable at one end to one of the edge card connectors, and a module interconnection board with connectors thereon, each for plugging onto the other end of the PCB of each module, the module interconnection board electrically interconnecting the modules to a bus connector that pluggably connects to a complementary bus connector mounted on the main housing for connection to a bus cable.

2. The system of claim 1 wherein the main housing includes a base, and the plurality of edge card connectors upstand from the base and are arranged in one or more rows.

3. The system of claim 2 wherein the edge card connectors comprise terminals having a connection section for connection of conducting wires to the terminals, the connection section being arranged along an outer edge of the base.

4. The system of claim 3 wherein the base is elongate and of a width adapted to receive the bus cable therebelow between outer side edges of the base.

5. The system of claim 1 wherein the main housing includes a base, and the connection assembly comprises a housing section extending from the base towards the module interconnection board for receiving a section of the bus cable therein, the complementary bus connector being mounted at an end of the housing section remote from the base.

6. The system of claim 1 wherein the module interconection board is a printed circuit board.

* * * * *